United States Patent
Durham et al.

(10) Patent No.: US 10,545,883 B2
(45) Date of Patent: Jan. 28, 2020

(54) VERIFICATION BIT FOR ONE-WAY ENCRYPTED MEMORY

(71) Applicant: Intel Corporation, Santa Clara, CA (US)

(72) Inventors: David M. Durham, Beaverton, OR (US); Kai Cong, Hillsboro, OR (US); Vedvyas Shanbhogue, Austin, TX (US); Barry E. Huntley, Hillsboro, OR (US); Jason W. Brandt, Austin, TX (US); Siddhartha Chhabra, Portland, OR (US); Ravi L. Sahita, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 181 days.

(21) Appl. No.: 15/720,799

(22) Filed: Sep. 29, 2017

(65) Prior Publication Data

US 2019/0102323 A1    Apr. 4, 2019

(51) Int. Cl.
*G06F 9/455* (2018.01)
*G06F 12/14* (2006.01)
*G06F 12/1009* (2016.01)

(52) U.S. Cl.
CPC ...... *G06F 12/1408* (2013.01); *G06F 9/45558* (2013.01); *G06F 12/1009* (2013.01); *G06F 2009/45583* (2013.01); *G06F 2009/45587* (2013.01); *G06F 2212/1052* (2013.01); *G06F 2212/65* (2013.01)

(58) Field of Classification Search
CPC ............ G06F 12/1408; G06F 9/45558; G06F 12/1009
USPC .......................................................... 713/193
See application file for complete search history.

(56) References Cited

U.S. PATENT DOCUMENTS

| | | | | |
|---|---|---|---|---|
| 6,746,330 B2 * | 6/2004 | Cannon | ................... | G07F 17/32 463/16 |
| 8,819,455 B2 | 8/2014 | Chhabra et al. | | |
| 2003/0061499 A1 * | 3/2003 | Durrant | ............... | G06F 12/1408 713/189 |
| 2004/0025039 A1 * | 2/2004 | Kuenzi | .............. | G07C 9/00309 713/193 |

(Continued)

FOREIGN PATENT DOCUMENTS

WO    2017112282 A1    6/2017

OTHER PUBLICATIONS

Shay Gueron, "A memory encryption engine suitable for general purpose processors", retrieved from eprint.iacr.org/2016/204.pdf, Feb. 25, 2016, 14 pages.

(Continued)

*Primary Examiner* — Michael S McNally
(74) *Attorney, Agent, or Firm* — Jordan IP Law, LLC

(57) ABSTRACT

An embodiment of a semiconductor package apparatus may include technology to identify a first encrypted memory alias corresponding to a first portion of memory based on a verification indicator, where the first portion is decryptable and readable by both a privileged component and an unprivileged component, and identify a second encrypted memory alias corresponding to a second portion of memory based on the verification indicator, where the second portion is accessible by only the unprivileged component. Other embodiments are disclosed and claimed.

24 Claims, 14 Drawing Sheets

(56) References Cited

U.S. PATENT DOCUMENTS

| | | | |
|---|---|---|---|
| 2013/0054886 A1* | 2/2013 | Eshraghian | G11C 13/0007 |
| | | | 711/108 |
| 2014/0019711 A1* | 1/2014 | Leggette | G06F 11/1076 |
| | | | 711/208 |
| 2017/0185532 A1 | 6/2017 | Durham et al. | |

OTHER PUBLICATIONS

U.S. Appl. No. 15/089,140, entitled "Convolutional memory integrity", filed on Apr. 1, 2016, 75 pages.

U.S. Appl. No. 15/444,771, entitled "Secure public cloud with protected guest-verified host control", filed on Feb. 28, 2017, 199 pages.

* cited by examiner

| | v-bit | KeyID | Address |
|---|---|---|---|
| VMM's R/W { | 0 | 0(shared) | 1..2..3..4.. |
| Read Only { | 0 | 1 | 1 |
| | 0 | 1 | 2 |
| | 0 | 2 | 3 |
| | 0 | 2 | 4 |
| VM Private R/W { | 1 | 1 | 1 |
| | 1 | 1 | 2 |
| | 1 | 2 | 3 |
| | 1 | 2 | 4 |

VERIFICATION BIT FOR ONE-WAY ENCRYPTED MEMORY

TECHNICAL FIELD

Embodiments generally relate to memory management. More particularly, embodiments relate to a verification bit for one-way encrypted memory.

BACKGROUND

Memory management may be useful in a wide variety of processing environments. In a virtual environment, a virtual machine manager (VMM) may help manage memory utilized or accessed by a number of virtual machines (VMs).

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
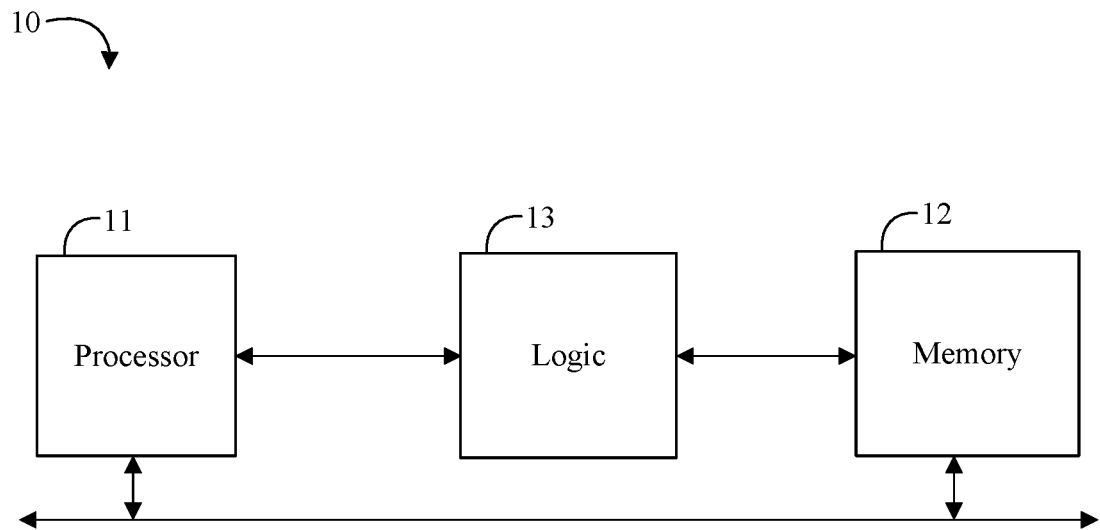
FIG. 1 is a block diagram of an example of an electronic processing system according to an embodiment.

Turning now to FIG. 1, an embodiment of an electronic processing system 10 may include a processor 11, memory 12 communicatively coupled to the processor 11, and logic 13 communicatively coupled to the memory 12 to identify a first encrypted memory alias corresponding to a first portion of the memory 12 based on a verification indicator, where the first portion is decryptable and readable by both a privileged component and an unprivileged component, and identify a second encrypted memory alias corresponding to a second portion of the memory 12 based on the verification indicator, where the second portion is accessible by only the unprivileged component. In some embodiments, the logic 13 may be configured to decrypt and communicate privileged information from the unprivileged component to the privileged component with a first decryption key, verify the privileged information from the unprivileged component, and run the unprivileged component if the privileged information is verified. For example, the logic 13 may also be configured to determine the first decryption key based on the verification indicator used as a tweak to a tweakable cipher or to select a second decryption key. In some embodiments, the logic 13 may read the verification indicator as the most significant bit of a physical memory address, other embodiments may use other bit positions as additional metadata. For example, the privileged component may include a virtual machine manager and the unprivileged component may include a guest virtual machine, and the privileged information may include one or more of a virtual machine control structure and an extended page table.

Embodiments of each of the above processor 11, memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including object-oriented programming languages such as PYTHON, PERL, JAVA, SMALLTALK, C++, C# or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 13, identifying a first encrypted memory alias corresponding to a first portion of the memory based on a verification indicator, identifying a second encrypted memory alias corresponding to a second portion of the memory based on the verification indicator, etc.).

Figure 2:
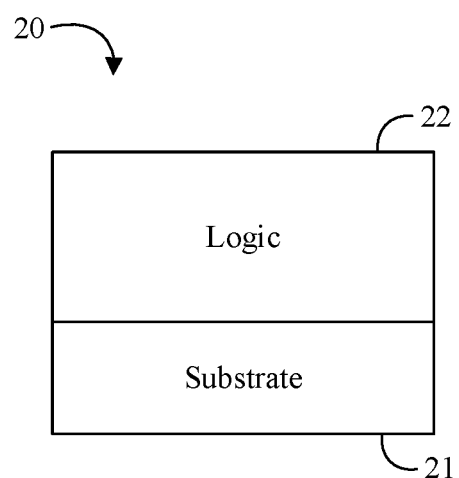
FIG. 2 is a block diagram of an example of a semiconductor package apparatus according to an embodiment.

Turning now to FIG. 2, an embodiment of semiconductor package apparatus 20 may include a substrate 21, and logic 22 coupled to the substrate 21, where the logic 22 is at least partly implemented in one or more of configurable logic and fixed-functionality hardware logic. The logic 22 coupled to the substrate 21 may be configured to identify a first encrypted memory alias corresponding to a first portion of memory based on a verification indicator, where the first portion is decryptable and readable by both a privileged component and an unprivileged component, and identify a second encrypted memory alias corresponding to a second portion of memory based on the verification indicator, where the second portion is accessible by only the unprivileged component. In some embodiments, the logic 22 may be configured to decrypt and communicate privileged information from the unprivileged component to the privileged component with a first decryption key, allow the privileged component to verify the privileged information from the unprivileged component, and run the unprivileged component if the privileged information is verified. For example, the logic 22 may also be configured to determine the first decryption key based on the verification indicator used as a tweak to a tweakable cipher or to select a second decryption key. In some embodiments, the logic 22 may read the verification indicator as the most significant bit of a physical memory address. For example, the privileged component may include a virtual machine manager and the unprivileged component may include a guest virtual machine, and the privileged information may include one or more of a virtual machine control structure and an extended page table.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 3A:
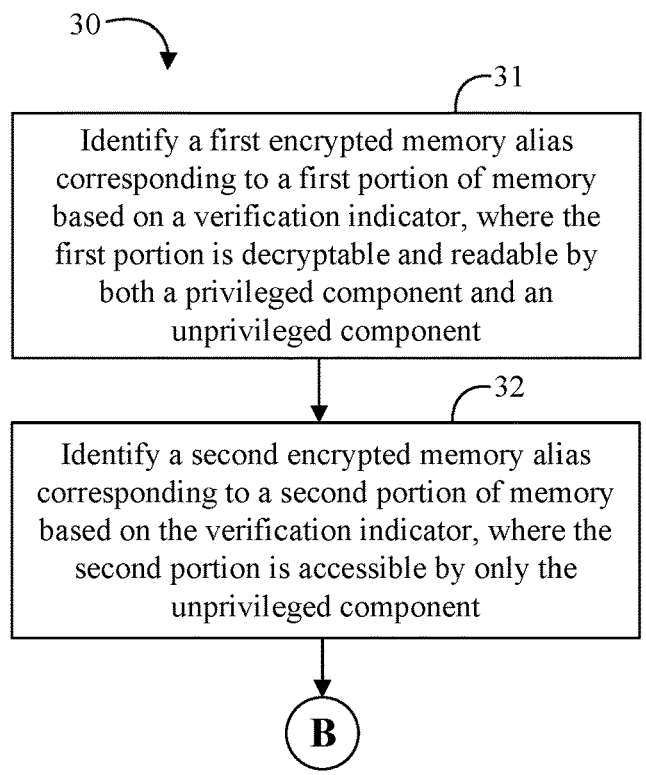
FIGS. 3A to 3C are flowcharts of an example of a method of managing a memory according to an embodiment.
Figure 3B:
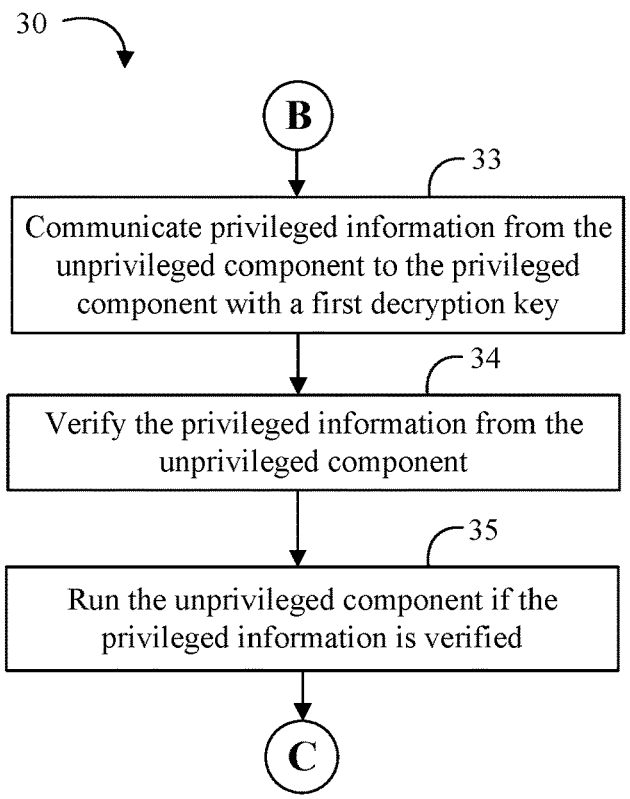
Figure 3C:
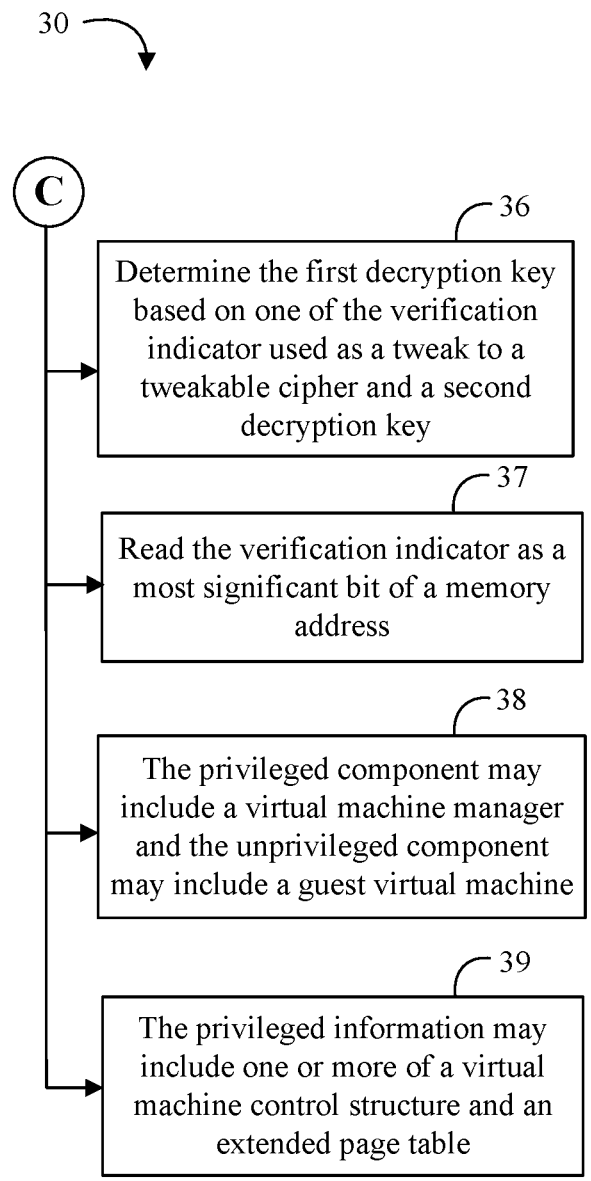

Turning now to FIGS. 3A to 3C, an embodiment of a method 30 of managing a memory may include identifying a first encrypted memory alias corresponding to a first portion of memory based on a verification indicator, where the first portion is decryptable and readable by both a privileged component and an unprivileged component, at block 31, and identifying a second encrypted memory alias corresponding to a second portion of memory based on the verification indicator, where the second portion is accessible decrypted by only the unprivileged component at block 32 (e.g., the privileged component would only have access to the encrypted ciphertext of the memory contents). Some embodiments of the method 30 may further include communicating privileged information from the unprivileged component to the privileged component with a first decryption key at block 33, then verifying the privileged information from the unprivileged component (e.g., by the privileged component) at block 34, and running the unprivileged component if the privileged information is verified at block 35. For example, the method 30 may also include determining the first decryption key based on the verification indicator used as a tweak to a tweakable cipher (e.g. xor-encrypt-xor (XEX) Tweakable Block Cipher with Ciphertext Stealing (XTS)) or selecting a second decryption key at block 36, and/or reading the verification indicator as the most significant bit of a memory address at block 37. In some embodiments of the method 30, the privileged component may include a virtual machine manager and the unprivileged component may include a guest virtual machine at block 38, and the privileged information may include one or more of a virtual machine control structure (and its associated structures) and one or more extended page tables at block 39.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 19 to 24 below. Embodiments or portions of the method 30 may be implemented in firmware, applications (e.g., through an application programming interface (API)), or driver software running on an operating system (OS).

Figure 4:
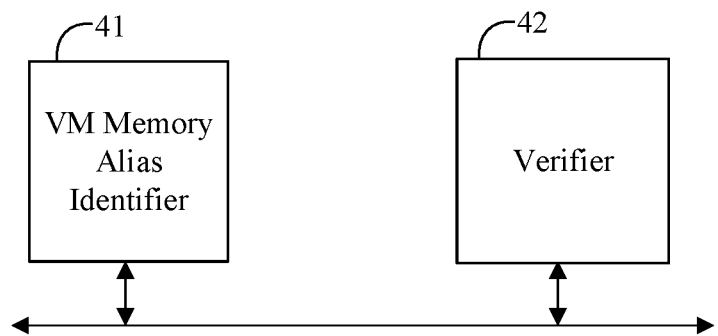
FIG. 4 is a block diagram of an example of a VMM apparatus according to an embodiment.

Turning now to FIG. 4, an embodiment of a VMM apparatus 40 may include a VM memory alias identifier 41, and a verifier 42. The VM memory alias identifier 41 may be configured to identify a first encrypted memory alias corresponding to a first portion of encrypted memory based on a verification indicator, where the first portion is decrypted and readable by both a privileged component and an unprivileged component, and identify a second encrypted memory alias corresponding to a second portion of memory based on the verification indicator, where the second portion is accessible decrypted by only the unprivileged component. In some embodiments, the verifier 42 may be configured to decrypt and communicate privileged information from the unprivileged component to the privileged component with a first decryption key, where the privileged component will verify the privileged information from the unprivileged component, and then run the unprivileged component if the privileged information is verified. For example, the verifier 42 may also be configured to determine the first decryption key based on the verification indicator as a tweak to a tweakable cipher (e.g., XTS) or using a second decryption key. In some embodiments, the VM memory alias identifier 41 and the verifier 42 may read the verification indicator as the most significant bit of a memory address. For example, the privileged component may include a virtual machine manager and the unprivileged component may include a guest virtual machine, and the privileged information may include one or more of a virtual machine control structure and an extended page table.

Embodiments of the VM memory alias identifier 41, the verifier 42, and other components of the VMM apparatus 40, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Some embodiments may advantageously provide a verification bit (e.g., sometimes referred to herein as v-bit). Some embodiments may provide read-only verification of encrypted memory based on the v-bit. For example, the v-bit may be a bit set by a central processor unit (CPU) to designate a region of memory as being encrypted and private (e.g., cryptographically inaccessible to the VMM and other VMs) or encrypted with a different key/tweak and accessible decrypted as read-only to the VMM. Advantageously, each VM may designate memory as being encrypted with the VM's exclusive key and shared read only, such that only the owning VM may populate the memory alias using the correct key, but the VMM may still decrypt and read the encrypted memory as plaintext. The VMM may also execute code therein, knowing the only entity that may populate the encrypted memory is the VM that owns the memory encryption key.

Some embodiments may include total memory encryption (TME) and/or multi-key TME (MKTME). Some embodiments may include TME with an integrity check (TMEi). In some embodiments, the applied encryption may be tweakable, such that different sections of memory may be processed in different ways. For example, some embodiments may include an xor-encrypt-xor (XEX)-based tweaked-codebook mode with ciphertext stealing (XTS).

Some embodiments may advantageously provide a one-way encrypted memory with many VM isolation usages including secure input/output (TO) and securely managing VM control structures such as VM control structures (VMCS), its associated data structures and extended page tables (EPTs) such that both the encrypted VM and the VMM may be assured that neither may be compromised by the other. In some embodiments, a verification indicator such as v-bit may provide this mutual verification model.

In some embodiments, each VM may have two encrypted memory aliases distinguished by the v-bit. One memory alias may be used to encrypt private memory such that only the VM may read or write to memory based on a KeyID in the physical address set when the CPU enters the VM. The other v-bit memory alias (e.g., included in a MKTME XTS tweak), may be used by the VM to encrypt a one-way memory that may be decrypted and read by the VMM by setting physical addresses in its page tables with the owning VM's KeyID, but cannot be modified by the VMM or other VMs as the CPU prevents the VM from writing to this one-way memory alias as identified by the verification bit. Advantageously, the owning VM may create a one-way channel for communicating control structures, extended page tables, code, I/O and any other information that may be decrypted, read and verified by the VMM.

Some embodiments may allow a VM (e.g., a guest) to securely communicate with a VMM (e.g., a host) where only the owning VM may encrypt the memory with its unique memory encryption key (a secret key), and the VMM may use the VM's KeyID to still read the memory (e.g., decrypted to plaintext) but not write to the memory or modify the memory with the VM's key/KeyID. Accordingly, some embodiments may allow a secure VM to share memory with a VMM where the VMM cannot alter the memory contents (e.g., or at least cannot correctly alter the memory contents, cannot produce the correct ciphertext not knowing the VM's secret key).

In some embodiments, a read-only decryption mechanism may be used so that the VM or its guest agent may create VM control structures such as the VMCS or EPTs, and the VMM may still decrypt these structures and verify the correctness before running the VM. In this way, the VM and its guest agent, and VMM may agree that the control structures will not compromise either party's security. Some embodiment may implement this model with a v-bit. Advantageously, the VMM may verify the correctness of these guest's provided structures without having the ability to alter them to compromise the guest's security. For example, the VMM may enable VM isolation with minimal change as its paging structures may be visible in memory for mappings, Accessed/Dirty (A/D) bit checks, table structures, etc. Advantageously, some embodiments with the v-bit may have no need for a memory ownership table, reverse mapping table, or any other CPU based access control to provide VM isolation (VMI).

Advantageously, because the one-way memory portion may be decrypted and readable to both the VM and VMM, it may also be executable code. This may allow the VMM to verify the code that only the VM owning the key may input, which in turn may enable the guest VM to provide code that the VMM may execute.

Figure 5:
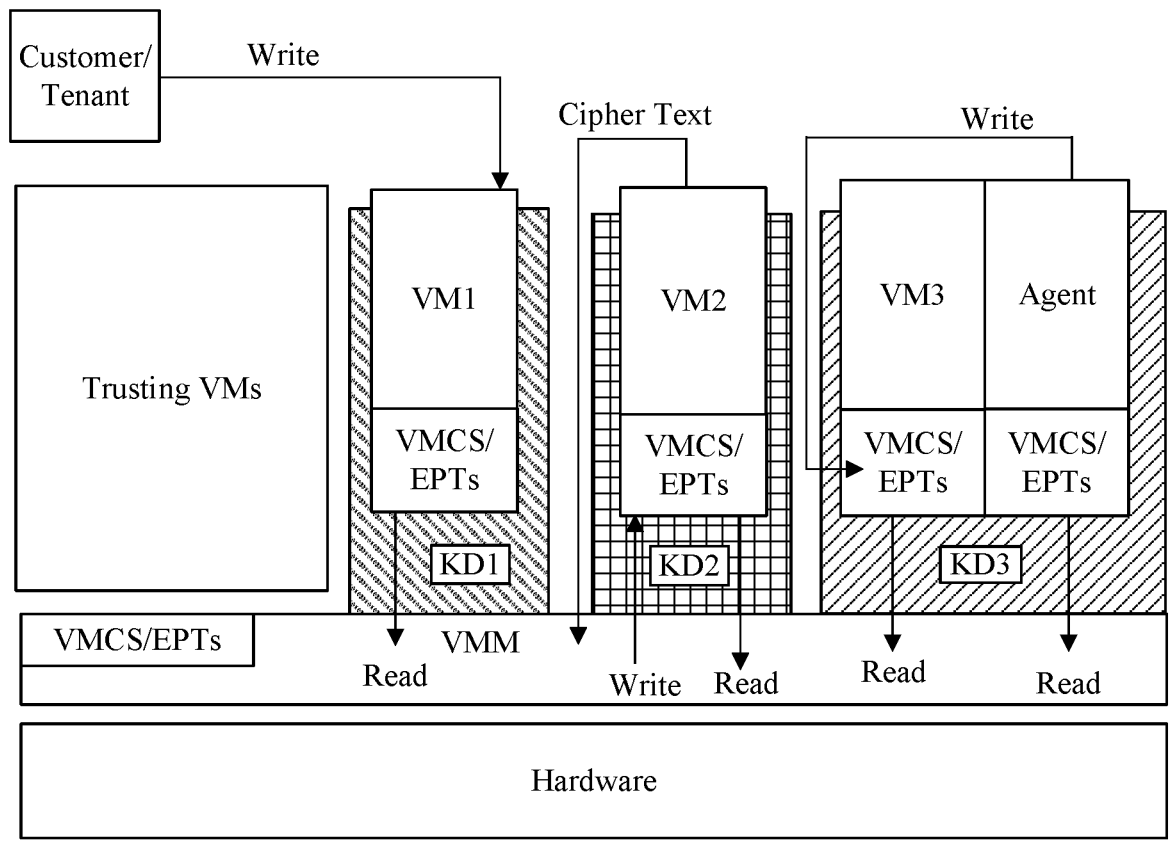
FIG. 5 is an illustrative diagram of an example of a virtual machine environment according to an embodiment.

FIG. 5 illustrates different VMs (VM1, VM2, VM3, and VM3's agent) within different key domains (KDs)/encrypted memory regions (KD1, KD2, KD3) using different keys. In some embodiments, the KDs may be cryptographically separated by keys identified by KeyID aliases within the physical address bits. The KeyID together with the v-bit may provide the address based separation while code/data is within the cache (as different KeyIDs and v-bits will be treated as different memory addresses by the cache) and the memory controller may select a key based on the KeyID and use the physical address and v-bit as a tweak at the memory controller to encrypt the code/data using the identified key before it is stored in memory (e.g., providing MKTME). Conversely, when loading code/data from memory, the memory controller may use the KeyID specified in the physical address being read to select a key and use the physical address and v-bit as a tweak to decrypt the code/data using the selected key.

A customer/tenant (e.g., a trusted 3rd party, a security processor, a converged security manageability engine (CSME) embedded system, other firmware, etc.) may produce an XTS image encrypted for a given platform's memory encryption key identified by a KeyID. For example, a server's public RSA key may be provided to a tenant wishing to securely run a VM on the server. The tenant may verify if the server's public key is legitimate by checking its CERT (e.g. RSA Certificate). If the CERT shows the server with the public key is legitimate, capable of implementing the methods of this invention, the tenant may encrypt its secret key with the server's public key where only the server's hardware (not the VMM) has the private key which it can use to decrypt the tenant's secret key for use as a memory encryption key. Then the server's hardware may assign a KeyID alias for the tenant's secret key. Using this secret key, the tenant may encrypt a memory image containing their VM's code and data, along with any privileged information such as the VMCS and EPTs (presumably provided to the tenant by the server's VMM/software, and verified as correct by the tenant) encrypted with the v-bit used as a tweak. This already encrypted image (ciphertext) may be preloaded in memory (e.g. through a non-encrypted KeyID alias) by the VMM as shown for VM1, and the ciphertext regions that are tweaked with the v-bit will be cryptographically accessible (e.g., decrypted using the memory encryption key provided by the tenent) by the VMM as read only. Advantageously, even when provided by the tenant as ciphertext, the VMM may verify critical structures such as VMCSs, EPTs, VM provided code, etc., before loading the VMCS (e.g., through a VM pointer load (VMPTRLD) instruction) and launching the VM (e.g. using VM Launch instruction) using the correct KeyID alias. Then when running the VM, the CPU will append to the physical memory addresses the KeyID specified by the VMM currently associated with the tenant's secret key (the memory encryption key). This way the tenant knows that its VM was launched using the VMCS and EPT's the tenant provided as ciphertext with its secret key, and the VMM knows that it safely launched the VM with the verified VMCS(s) and EPT(s).

Once loaded, a VM knowing its own memory encryption secret key may provide the VMM additional control/paging structures, data, or code after encrypting it (e.g. with XTS) for the memory locations specified by the VMM. The VMM may then load this ciphertext into the correct memory locations through the shared (e.g. non-encrypted/plaintext) KeyID alias. In some embodiments, a guest VM/agent may cryptographically update itself. Alternatively, or additionally, a second guest/agent running within the same encrypted memory space (e.g., same key/KeyID for KD3) acting on behalf of the VM3 may be given permission (e.g., by the VMM through the EPTs/VMCS) to edit the control structures (e.g., VMCS/EPTs) of the virtual machine VM3 directly by writing to the associated memory while running within the same key domain.

Figures 6, 7:
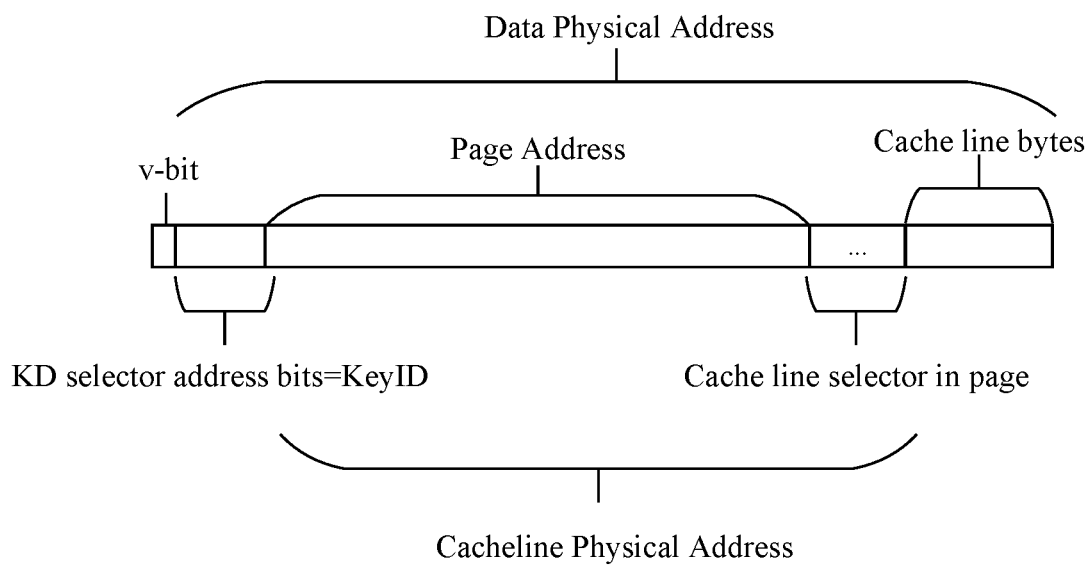
FIG. 6 is an illustrative diagram of an example of an aliased memory layout according to an embodiment.
FIG. 7 is an illustrative diagram of an example of a memory layout according to an embodiment.

FIG. 6 shows an aliased memory layout where a physical address constitutes the v-bit, a KeyID alias and physical memory location (e.g., address). The physical memory locations may overlap, or are aliased, where the KeyID may be used to identify which key encrypts/decrypts the memory at that address alias on a memory write/read operation. KeyID zero (0) may be reserved to mean no encryption and may be shared across VMs and the VMM. Some embodiments may provide the v-bit as the upper address bit for all other KeyIDs to designate two memory ranges, one that the CPU will intrinsically ensure is read only, and the other that is only accessible while in guest mode (e.g., when v-bit=1). Utilizing v-bit as the most significant bit in the address advantageously splits the keyed regions into a cryptographically private range for the guest and a read-only public range. The VM owning the KeyID may be permitted to read/write to either of its v-bit regions (e.g., as other permissions in the paging structures otherwise allow), but the VMM may only decrypt and only read from the v-bit=0 region. Both regions may be encrypted in memory.

FIG. 7 shows an example of the format for the physical memory address. A cacheline physical address may include a page address in memory together with a cache line selector in a page. A data physical address may include the cacheline physical address sandwiched between an entry for the cache line bytes and the above discussed KeyID. A verification bit, v-bit, may be provided as the most significant bit of the physical memory address. The data physical address stored in may not include the v-bit as it is included as part of the tweak used by the cipher to compute the ciphertext of the data. The KeyID may provide the selector address bits for the key domain, selecting the key used to encrypt/decrypt the memory contents. Some embodiments may simplify software utilized to enable the one-way memory access. For example, some embodiments may utilize a separate VM encryption key or tweak for the VMCSs, EPTs, IO, and/or shared code as determined by the v-bit. If the value of the v-bit is zero (0), for example, then the CPU may allow the VMM to decrypt and read the VM's memory contents at that address. The memory may be encrypted with a different key and/or tweak (e.g., relative to the portion of memory corresponding to v-bit=1) where the CPU may not allow memory accesses by the VMM to include a memory address alias with v-bit=1. The VMM may set the VM's KeyID in the VMM's page table entries (PTEs). The VMM may be prevented or prohibited from changing the v-bit value in the address. The VM may both read and/or write to the v-bit=0 region of memory for its own KeyID. Some embodiments may use the v-bit as a tweak or a key to an XTS cipher. Some embodiments may create an XTS ciphertext for the VMM to install.

Figure 8:
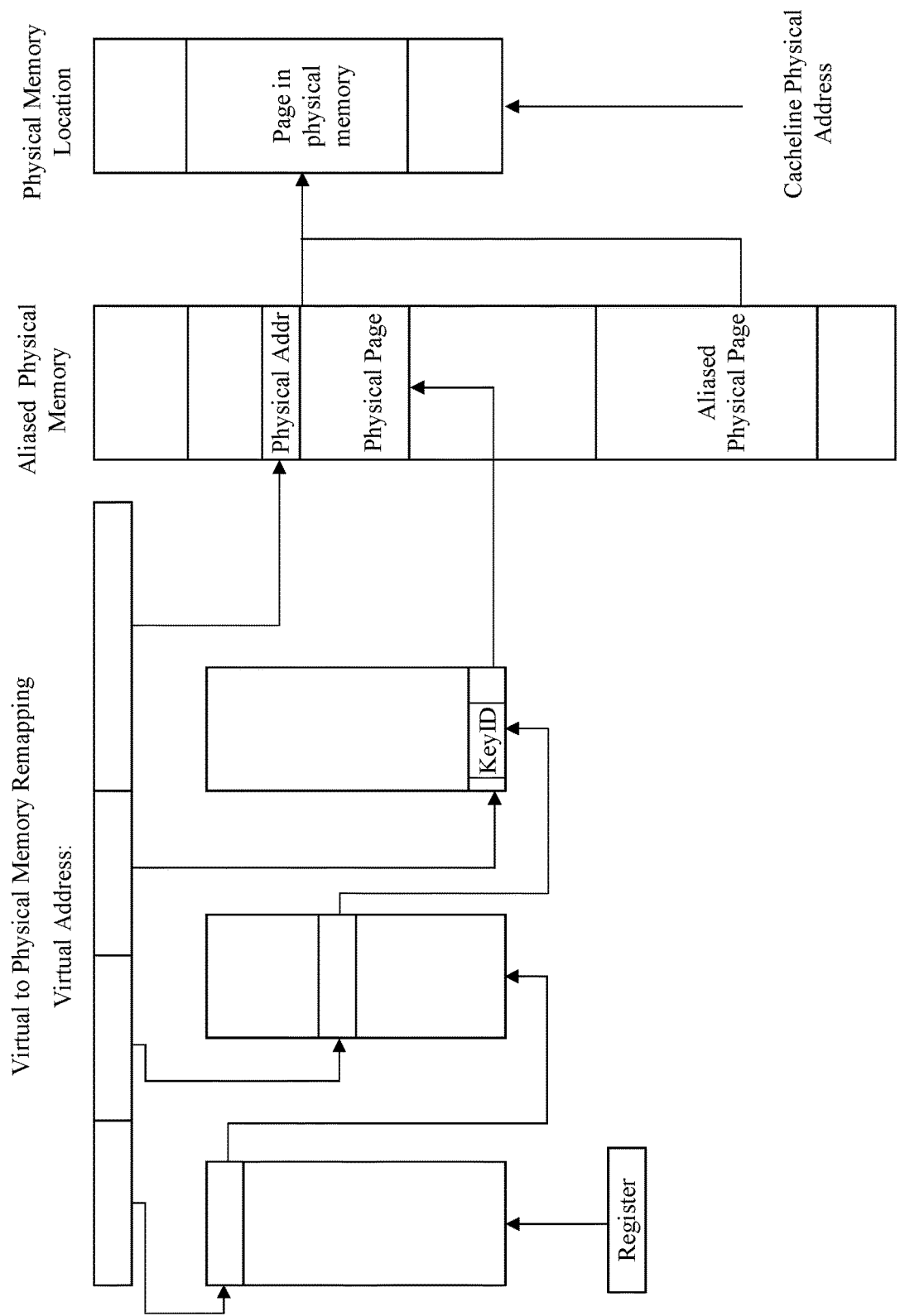
FIG. 8 is an illustrative diagram of an example of virtual to physical memory remapping according to an embodiment.

FIG. 8 shows an example of how the VMM may manage this space through its page tables when running in VMX-Root mode. Although illustrated with three levels, any useful number of levels of format may be utilized for the page tables. The VMM may use a processor register (e.g. CR3) to identify the active paging structure, e.g. a pointer to a page table, which translates a virtual (e.g., linear) address to a physical address. In VMXRoot mode, the physical address specified in the page table entry may include the KeyID alias as part of the specified physical address. In VMXRoot mode, the CPU may set (or force) the v-bit in the memory address to zero (0), such that KeyIDs for various VMs are accessible read-only using v-bit=0 in the encryption tweak (where only KeyID=0 is both readable and writable to the VMM). In some embodiments, TME may translate the aliased KeyIDs into a same physical address in memory (e.g., using the address and v-bit in the tweak), but encrypt/decrypt the memory contents with the key selected by the KeyID. The VMM is never able to access the guests' private memory (e.g., corresponding to v-bit=1), but is free to address all KeyIDs' v-bit=0 memory regions. Regardless of the page table permissions, the CPU may force that the v-bit=0 regions for all non-zero KeyIDs remain read-only (e.g., read-only and executable). For example, the CPU may use a physical memory range register (PMRR) to ensure that VMXRoot may only read/execute from the v-bit=0 region. In some embodiments, the VMM may be free to read and write to its own KeyID=0 memory region/alias. For the VMM to decrypt and read from another VM, the VMM may access the VM's accessible memory space (e.g., v-bit=0) through an address with a KeyID corresponding to that VM's key domain (memory encrypted with that VM's secret key).

Figure 9:
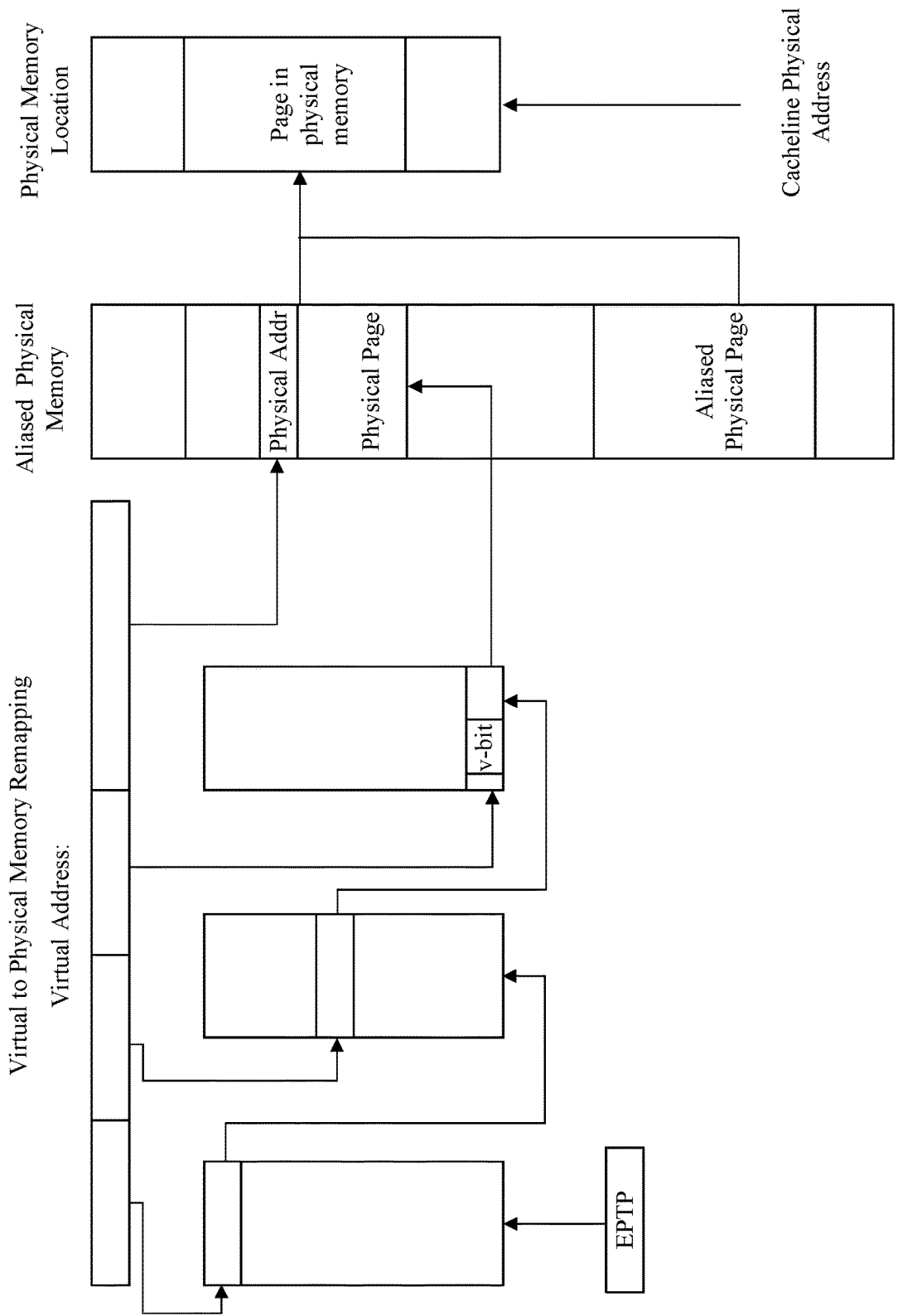
FIG. 9 is an illustrative diagram of an example of guest physical to host physical memory remapping according to an embodiment.

FIG. 9 shows an example of the format of the extended page tables (EPTs). When running in a guest mode, a VMCS may include an extended page table pointer (EPTP) that translates a Guest Physical Address (GPA) to a host physical address (HPA, or physical address). The CPU will select the KeyID associated with currently executing guest and append it to the physical address. In some embodiments, TME may translate the aliased physical memory into a same physical memory location (e.g., using the address and v-bit in the tweak) using the KeyID to select the memory encryption key. In guest mode, the CPU may set the v-bit to the value specified in the extended page table entry (EPTE) (e.g., 0 or 1) where v-bit is a new bit value in the EPTE format. As a guest is launched within a particular KeyID, the CPU may force the KeyID in the physical addresses on the bus (e.g. the KeyID is not specified in the extended page table entries). For example, in guest mode the CPU may set the KeyID to the same KeyID as the launched (e.g., running) VM. Accordingly, the KeyIDs may not be specified in the guest mode paging structures (e.g., the EPTE physical address may not include the KeyID). The v-bit may be specified in the EPTEs such that the guest may decide which of its pages are shared as read only (e.g., v-bit=0) or kept private (e.g., v-bit=1). The guest may also specify a c-bit which may select that the VMM's KeyID=0 is used. For example, the c-bit may determine whether or not a page of memory is to be encrypted, or (in some other embodiments) encrypted with the VMM's key. Because the paging structure is verifiable by the VMM before launching the guest, the VMM may still ensure that its memory is protected by the extended page table mappings before the VM is launched. Alternatively, in other embodiments, the guest's OS page tables may also specify v-bit and c-bit overriding the EPT values.

Figure 10:
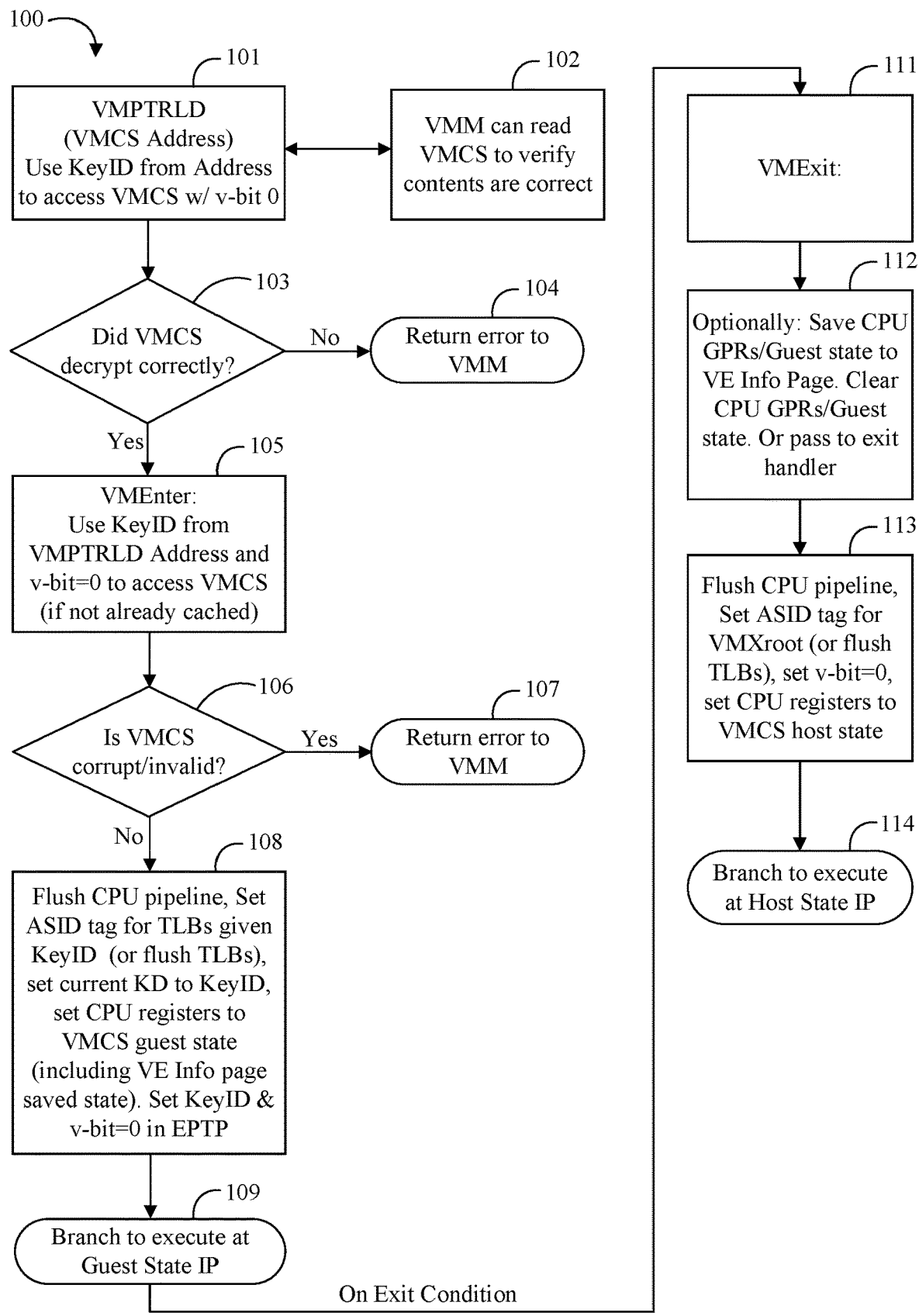
FIG. 10 is a flowchart of an example of a method of virtual machine entry and exit according to an embodiment.

FIG. 10 shows a method 100 for VMEnter flows and VMExit flows. At block 101, the CPU may set the KeyID to that of the address specified on a VMPTRLD. For example, the VMM may read the VMCS to verify that the contents are correct at block 102. At block 103, if the VMCS does not decrypt correctly, the method 100 may return an error to the VMM at block 104. Otherwise, if the VMCS decrypts correctly (e.g., version and other consistency checks pass) at block 103, it is a valid VMCS for the specified KeyID and the method 100 may proceed to VMEnter at block 105. At VMEnter, the method 100 may use the KeyID from the VMPTRLD address and v-bit=0 to access the VMCS (e.g., if not already cached). The method 100 may then determine if the VMCS is corrupt or invalid at block 106 and, if so, return an error to the VMM at block 107. If the VMCS passes the check at block 106, the method 100 may then flush the CPU pipeline, set the address space identifier (ASID) tag for translation lookaside buffers (TLBs), set the current key domain to the KeyID, set CPU registers to VMCS guest state (e.g., including Virtualization Exception (VE) info page saved state with v-bit=1), and/or set the KeyID and v-bit=0 in the EPTP at block 108. The method 100 may then branch to execute the instruction at the VMCS specified guest state instruction pointer (IP) at block 109.

The CPU may assign the KeyID from the VMPTRLD address to all physical addresses then accessed by the VM after it is launched (e.g., VMLaunch/Resume). On an exit condition, the method 100 may proceed to VMExit at block 111. At block 112, the method 100 may optionally save CPU general purpose registers (GPRs)/Guest state information to the VE info page (within the guest's private memory, v-bit=1), clear the CPU GPRs/Guest state information (that the VM wishes to hide from the VMM), and/or have an exit handler perform those functions. The method 100 may then flush the CPU pipeline, set the ASID tag for VMXRoot (e.g., or flush the TLBs), set v-bit=0, and/or set the CPU registers to VMCS host state at block 113, and branch to execute the instruction at the host state IP specified in the VMCS at block 114.

Upon exiting from guest mode, for example, the CPU may force the v-bit to 0 for all VMXRoot memory accesses. A PMRR and/or the PMH may ensure that VMXRoot may only read/execute from the v-bit=0 region (e.g., not write) except to its own memory region with KeyID=0 (e.g., as specified in page table entries). ASIDs may return to root mode, thereby ensuring the guest's TLB translations (with v-bit=1) are not used while in VMXRoot mode. Accordingly, any memory encrypted with a guest's key for v-bit=1 will appear as ciphertext to the VMM (e.g., or cause integrity failures with TMEi), but v-bit=0 encrypted memory will decrypt as read-only for the VMM when accessed using the correct KeyID/key.

Figure 11:
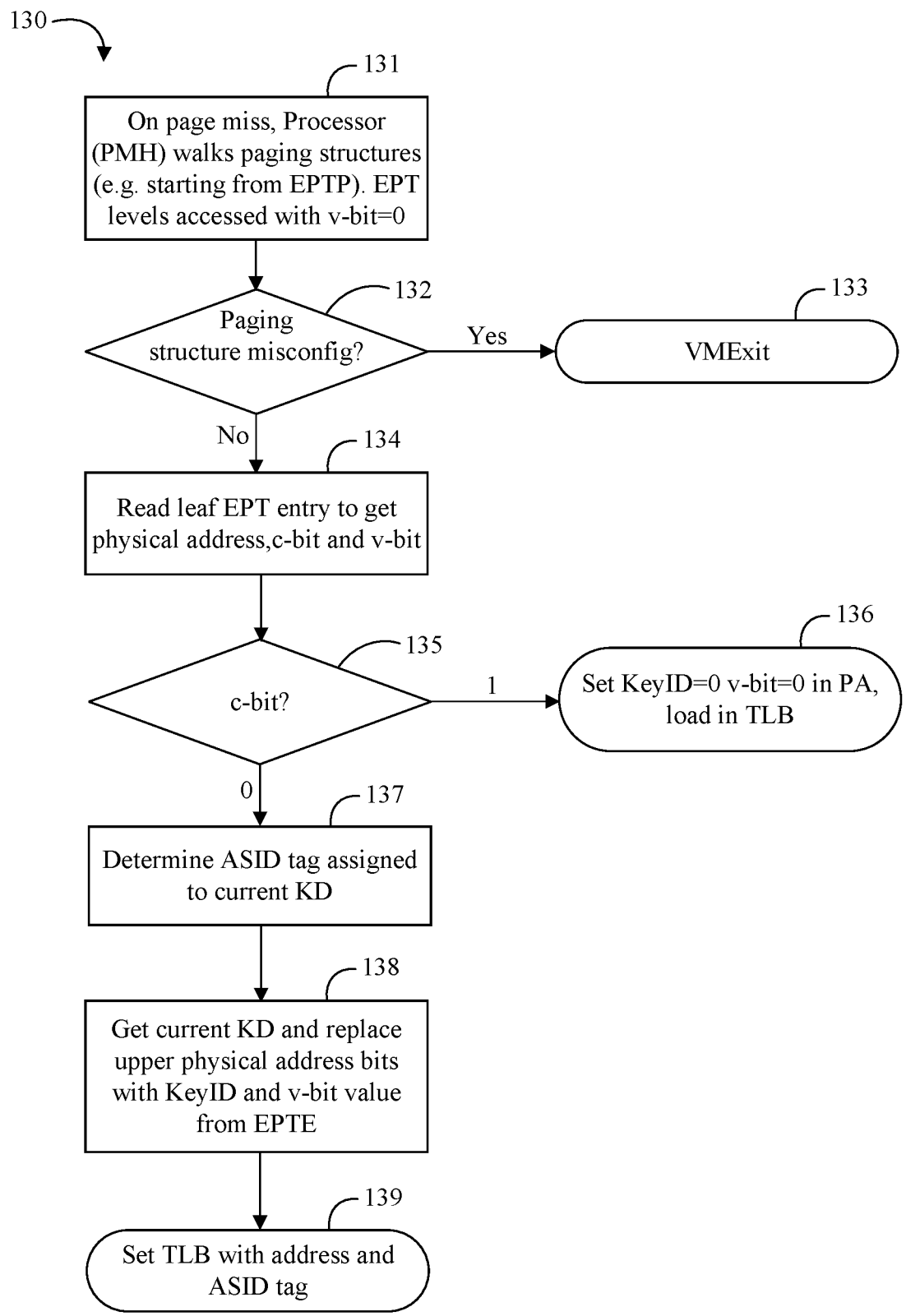
FIG. 11 is a flowchart of an example of a method of page miss handling according to an embodiment.

Turning now to FIG. 11, a method 130 of handling a page miss by the PMH may include the CPU walking through the paging structures (e.g., starting from EPTP) at block 131. The guest paging structure entries as walked by the PMH determine the value of v-bit for each memory page accessed by the running VM. The method 130 may then determine if the paging structure is misconfigured at block 132 and, if so, may proceed to VMExit at block 133. Otherwise, the method 130 may proceed to read leaf EPT entries to get the physical address, c-bit, and v-bit at block 135. The method 130 may then determine the value of c-bit at block 135. If c-bit is 1 at block 135, the method 130 may set KeyID=0 and v-bit=0 in the physical address (PA) and load the physical address translation in the TLB at block 136. Otherwise, the method 130 may proceed to determine the ASID tag assigned to the current key domain at block 137. The method 130 may then get the current key domain and replace the upper physical address bits with the KeyID for the current key domain and the v-bit value from the EPTE at block 138. The method 130 may then set the TLB translation with the physical address, Key-ID, v-bit and the ASID tag at block 139.

Figure 12:
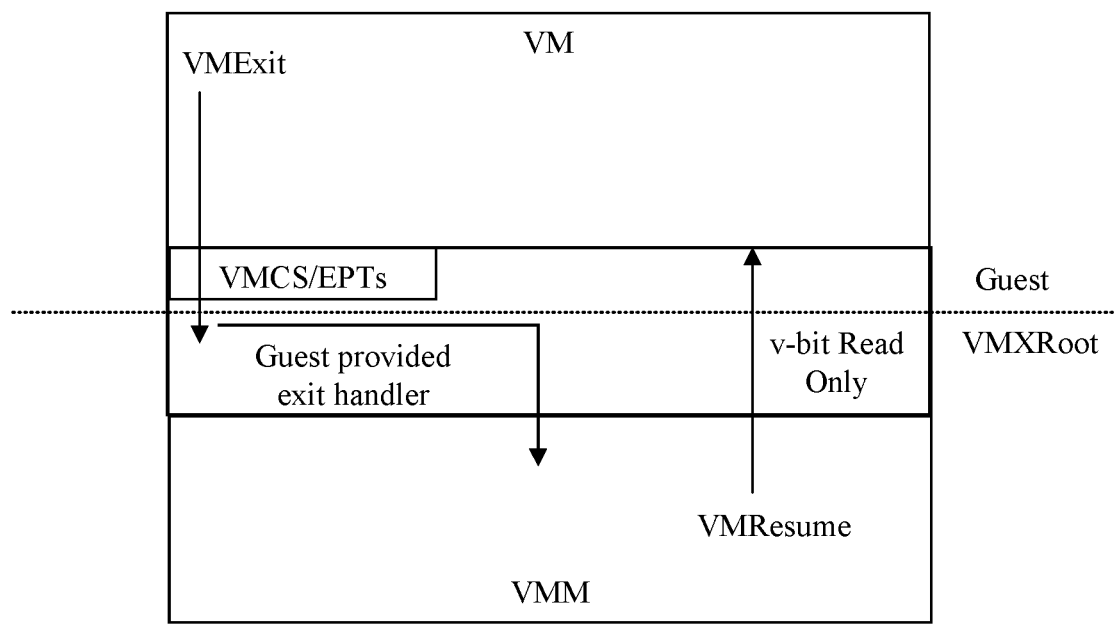
FIG. 12 is an illustrative diagram of another example of a virtual machine environment according to an embodiment.

FIG. 12 shows how code may be shared between an encrypted VM and VMM such that the VM provides its own VMExit handler. For example, the VM may configure its VMCS to point to its exit handler in the v-bit space where the VMM may see/verify the guest provided exit handler code/data (e.g., the VM provided exit handler may include code as well as the VMM page table, stack, ISRs, IDT, GDT, IST, etc. specified in the VMCS host state area). Accordingly, following verification the VMM may trust that the VMCS it loads will have a secure exit handler (e.g., by providing approved handler code to the tenant owning the VM), and the tenant may be assured that the exit handler that only the tenant loads into their protected memory will perform actions on behalf of the tenant, such as securely saving (encrypting, integrity protecting, etc.) GPRs, XMM registers, and other CPU state before transitioning to code paths controlled exclusively by the VMM. Advantageously, some embodiments may reduce or eliminate the need for the CPU to provide any such logic in hardware because the v-bit may provide bilaterally verified privileged software. In some embodiments, a key locker (e.g., KEYLOCKER) may be used by the exit handler to protect a VM key used for encrypting GPRs and other CPU state after the VMExit because the VM's private memory will not be accessible by the external handler (e.g., exit v-bit set to 0). Other embodiments may use an ephemeral key in a processor register (e.g. model specific register, MSR) that the guest provided exit handler will use to encrypt and/or clear processor register contents (including this MSR key) prior to transitioning control to the VMM. On VMM resumption of the guest VM, a guest exception/interrupt handler specified in the VMCS may then be used to restore the encrypted register contents along with the MSR key before returning execution at the point the exit condition occurred (e.g. using the IRET instruction).

Figure 13A:
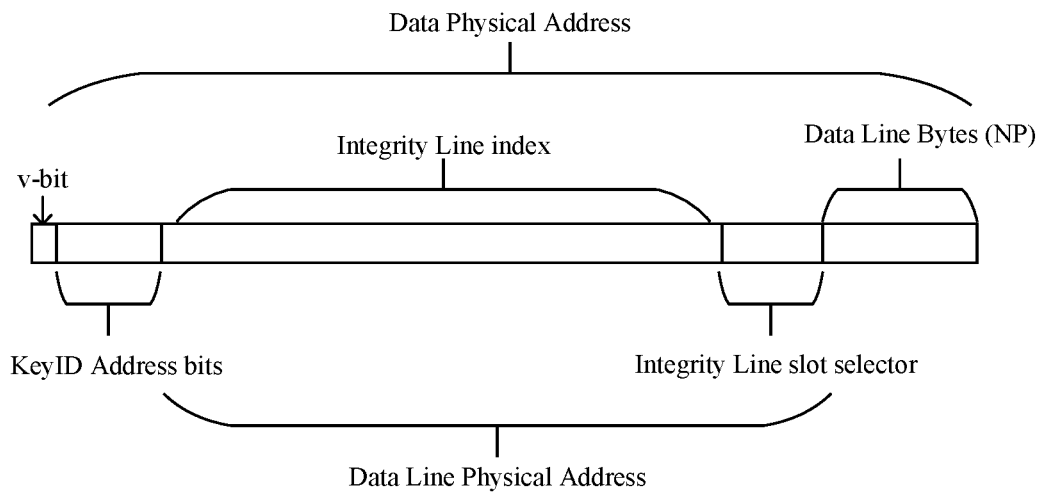
FIG. 13A is an illustrative diagram of another example of a memory layout according to an embodiment.
Figure 13B:
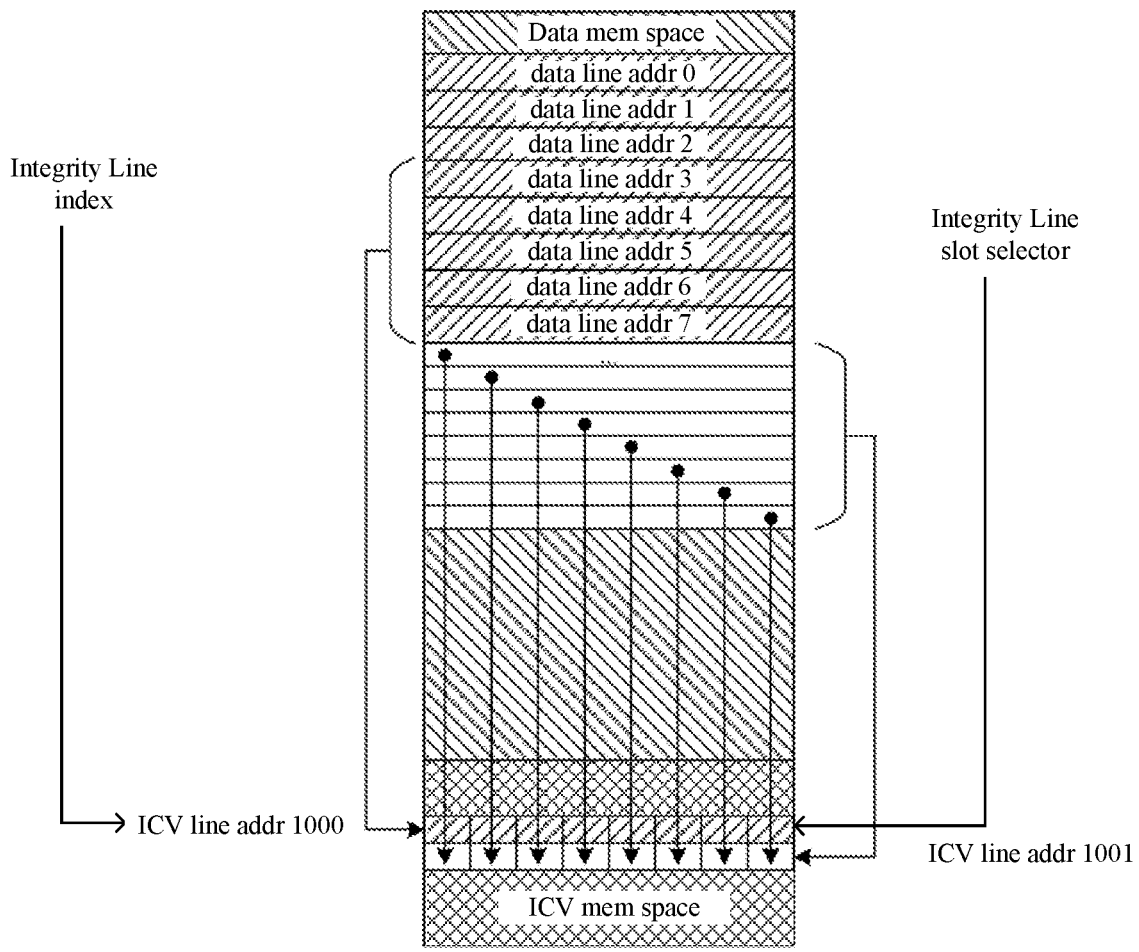
FIG. 13B is an illustrative diagram of an example of a memory integrity check according to an embodiment.

FIGS. 13A and 13B show how beyond memory encryption, integrity may also be applied in some embodiments. A data line physical address may correspond to an actual location in memory and may include an integrity line index and an integrity line slot selector (e.g., within the integrity line). A data physical address may include the data line physical address sandwiched between a data line bytes (NP) entry and the KeyID address bits (e.g., which may be aliased to a same physical address in memory). The memory layout may further include a v-bit as the most significant bit of the address.

The cumulative integrity check value (ICV) line location and slot may be determined by TMEi from the physical memory address. For example, using the wrong KeyID to access a memory page/line may generate an error because the integrity check fails (e.g. a keyed secret hash algorithm such as SHA2 or SHA3 may be used to generate a MAC, and the MAC may be compared with the ICV/MAC value stored on an ICV line) when the data line does not decrypt properly. Accordingly, TMEi may provide access control (e.g., preventing the VMM from accessing VM pages encrypted with v-bit=1) while allowing the VMM to read pages with v-bit=0. Similarly, any VM accessing another VM's encrypted memory may cause an integrity failure. The VMM's KeyID=0 memory may generally be accessed by all VMs.

Some embodiments may advantageously provide a verification indicator (e.g., the v-bit) and utilize the verification indicator to provide a per-guest cryptographically-protected one-way memory channel. Only the guest may populate the memory based on the verification indicator (e.g., with the correct key), but the host may still read/execute the memory as plaintext by selecting the guest's KeyID. Some embodiments may advantageously improve security for a public cloud using hardware-based security. Cloud customers (e.g., tenants, consumers, etc.) may prefer that their workloads are secure before moving to a public cloud infrastructure. Advantageously, some embodiments may allow a cloud provider to offer security methods as described herein to protect their users from hacking, physical access, administrators, privileged software and the cloud provider itself (e.g., by inhibiting or preventing access to portions of memory secured by the v-bit). Some embodiments may efficiently allow a guest workload to protect itself from the host by maintaining its own control structures and IO. At the same time, some embodiments may allow the host to protect itself from the guest as the read-only aperture, and allow the host to verify all control structures before committing to execute the guest using them. Some embodiments may advantageously provide enhanced security, protecting the tenant's VM from memory disclosure and remapping attacks, all while enabling legacy VMMs to function with minimal change.

Figure 14:
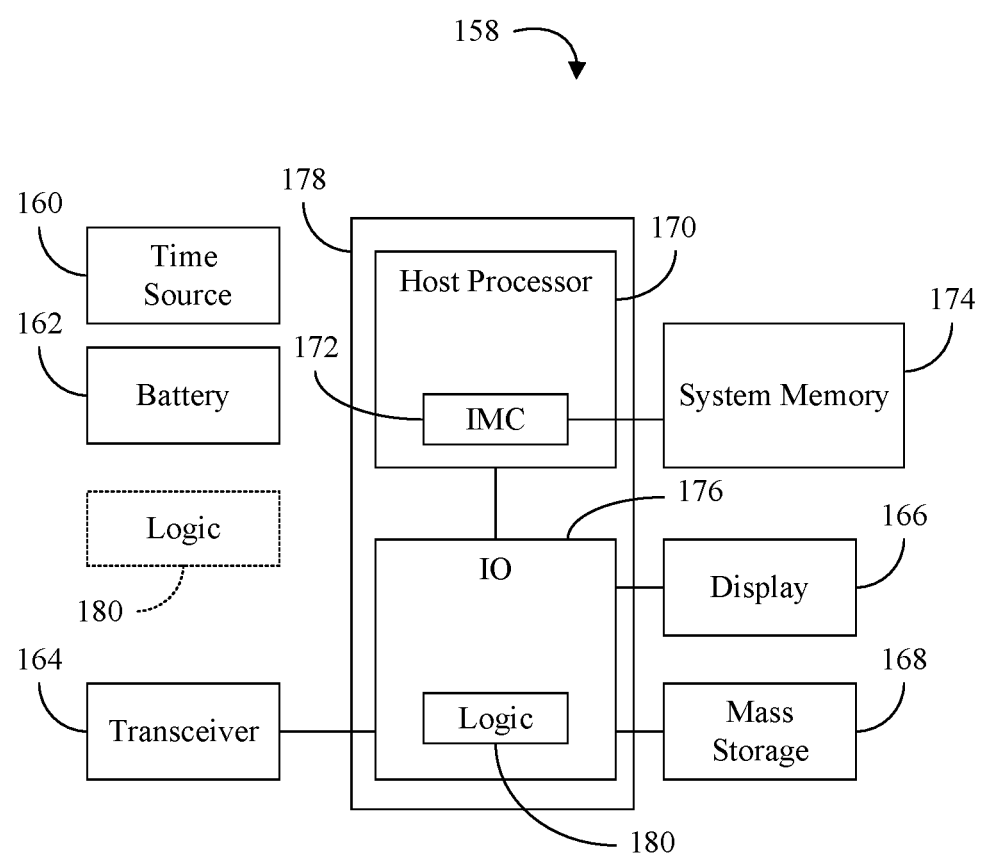
FIG. 14 is a block diagram of an example of a computing device according to an embodiment.

FIG. 14 shows a computing device 158 that may be readily substituted for one or more of the electronic processing system 10 (FIG. 1), the VMM apparatus 40 (FIG. 4), and/or may implement the various memory structure and/or virtualization environments, already discussed. In the illustrated example, the device 158 includes a time source 160 (e.g., crystal oscillator, clock), a battery 162 to supply power to the device 158, a transceiver 164 (e.g., wireless or wired), a display 166 and mass storage 168 (e.g., hard disk drive (HDD), solid state disk (SSD), optical disk, flash memory). The device 158 may also include a host processor 170 (e.g., CPU) having an integrated memory controller (IMC) 172, which may communicate with system memory 174. The system memory 174 may include, for example, dynamic random access memory (DRAM) configured as one or more memory modules such as, for example, dual inline memory modules (DIMMs), small outline DIMMs (SODIMMs), etc. The illustrated device 158 also includes an input output (IO) module 176 implemented together with the processor 170 on a semiconductor die 178 as a system on chip (SoC), wherein the IO module 176 functions as a host device and may communicate with, for example, the display 166, the transceiver 164, the mass storage 168, and so forth. The mass storage 168 may include non-volatile memory (NVM) that stores one or more keys (e.g., MAC generation keys, encryption keys).

The IO module 176 may include logic 180 that causes the semiconductor die 178 to operate as a VMM such as, for example electronic processing system 10 (FIG. 1), the VMM apparatus 40 (FIG. 4), and/or the other VMM embodiments, already discussed. Thus, the logic 180 may identify a first encrypted memory alias corresponding to a first portion of memory based on a verification indicator, where the first portion is decrypted and readable by both a privileged component and an unprivileged component, and identify a second encrypted memory alias corresponding to a second portion of memory based on the verification indicator, where the second portion is accessible by only the unprivileged component. In some embodiments, the logic 180 may decrypt and communicate privileged information from the unprivileged component to the privileged component with a first decryption key, verify the privileged information from the unprivileged component, and run the unprivileged component if the privileged information is verified. For example, the logic 180 may also determine the first decryption key based on either the verification indicator used as a tweak to a tweakable cipher or to select a second decryption key.

In some embodiments, the logic 180 may read the verification indicator as the most significant bit of a memory address. For example, the privileged component may include a virtual machine manager and the unprivileged component may include a guest virtual machine, and the privileged information may include one or more of a virtual machine control structure and an extended page table. In one example, the time source 160 is autonomous/independent from the controller in order to enhance security (e.g., to prevent the controller from tampering with cadence, frequency, latency and/or timestamp data). The logic 180 may also be implemented elsewhere in the device 158.

Figure 15:
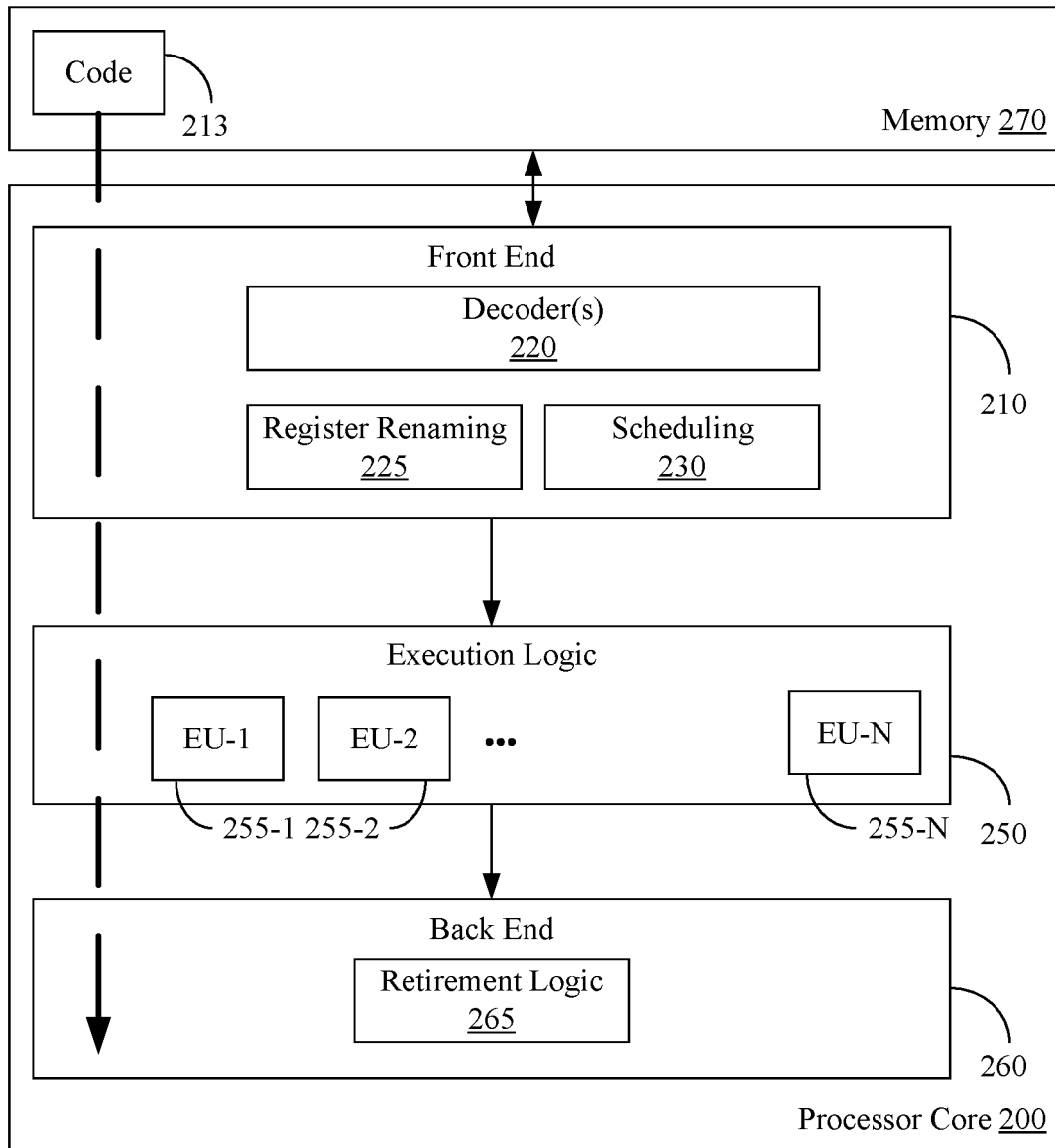
FIG. 15 is a block diagram of an example of a processor according to an embodiment.

FIG. 15 illustrates a processor core 200 according to one embodiment. The processor core 200 may be the core for any type of processor, such as a micro-processor, an embedded processor, a digital signal processor (DSP), a network processor, or other devices to execute code. Although only one processor core 200 is illustrated in FIG. 15, a processing element may alternatively include more than one processor core 200 illustrated in FIG. 15. The processor core 200 may be a single-threaded core or, for at least one embodiment, the processor core 200 may be multithreaded in that it may include more than one hardware thread context (or "logical processor") per core.

FIG. 15 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 30

(FIGS. 3A to 3C), the method 100 (FIG. 10), and/or the method 130 (FIG. 11), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that may perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 15, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 16:
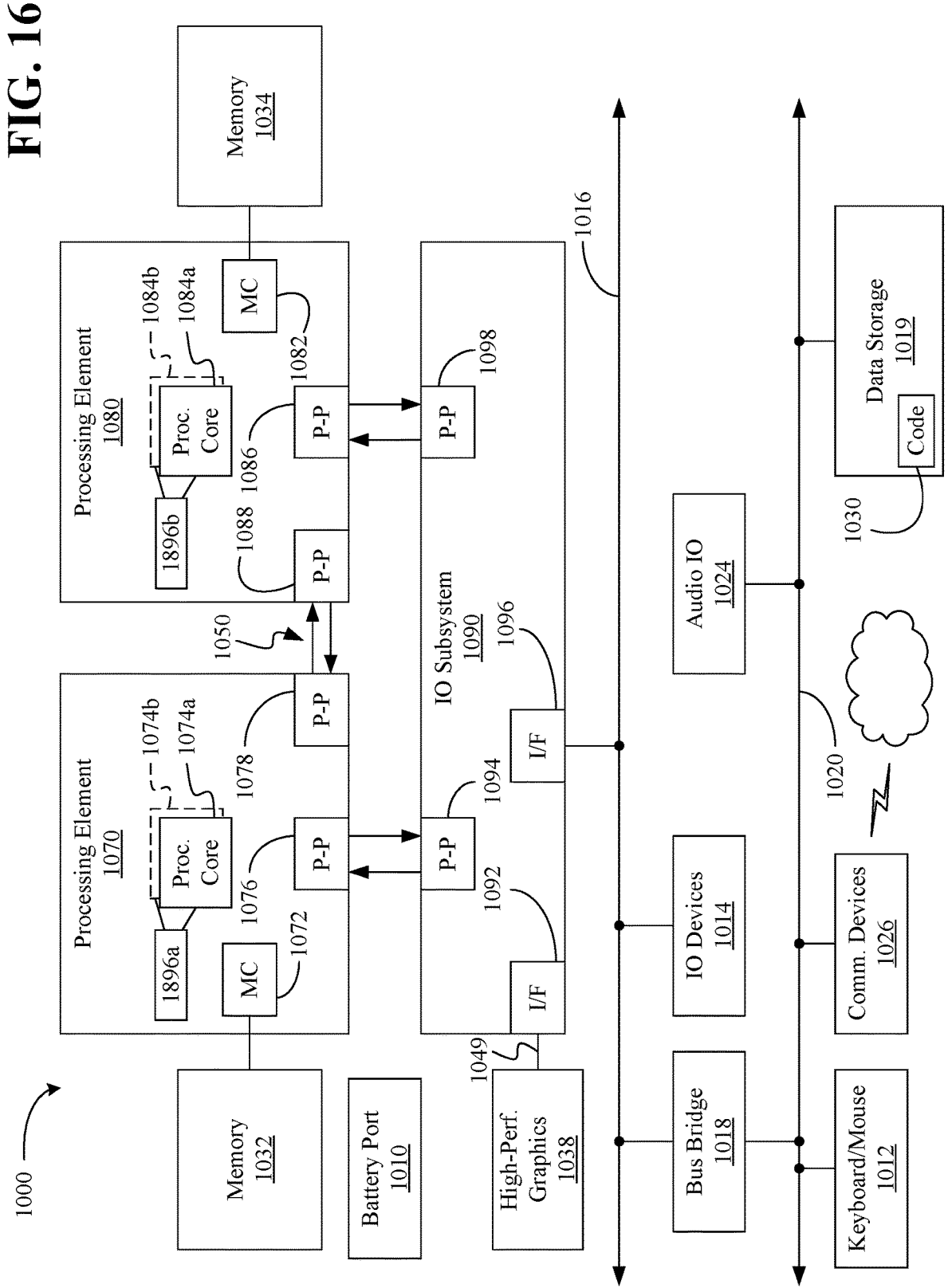
FIG. 16 is a block diagram of an example of a computing system according to an embodiment.

Referring now to FIG. 16, shown is a block diagram of a computing system 1000 embodiment in accordance with an embodiment. Shown in FIG. 16 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 16 may be implemented as a multi-drop bus rather than point-to-point interconnect.

As shown in FIG. 16, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 15.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There may be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 16, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 16, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments is not so limited.

As shown in FIG. 16, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 30 (FIGS. 3A to 3C), the method 100 (FIG. 10), and/or the method 130 (FIG. 11), already discussed, and may be similar to the code 213 (FIG. 15), already discussed. Further, an audio I/O 1024 may be coupled to second bus 1020 and a battery port 1010 may supply power to the computing system 1000.

Note that other embodiments are contemplated. For example, instead of the point-to-point architecture of FIG. 16, a system may implement a multi-drop bus or another such communication topology. Also, the elements of FIG. 16 may alternatively be partitioned using more or fewer integrated chips than shown in FIG. 16.

Additional Notes and Examples:

Example 1 may include an electronic processing system, comprising a processor, memory communicatively coupled to the processor, and logic communicatively coupled to the memory to identify a first encrypted memory alias corresponding to a first portion of the memory based on a verification indicator, wherein the first portion is decryptable and readable by both a privileged component and an unprivileged component, and identify a second encrypted memory alias corresponding to a second portion of the memory based on the verification indicator, wherein the second portion is accessible by only the unprivileged component.

Example 2 may include the system of Example 1, wherein the logic is further to decrypt and communicate privileged information from the unprivileged component to the privileged component with a first decryption key, verify the privileged information from the unprivileged component, and run the unprivileged component if the privileged information is verified.

Example 3 may include the system of Example 2, wherein the logic is further to determine the first decryption key based on one of the verification indicator used as a tweak to a tweakable cipher and a second decryption key.

Example 4 may include the system of Example 2, wherein the logic is further to read the verification indicator as a most significant bit of a physical memory address.

Example 5 may include the system of any of Examples 2 to 4, wherein the privileged component comprises a virtual machine manager and wherein the unprivileged component comprises a guest virtual machine.

Example 6 may include the system of any of Examples 2 to 4, wherein the privileged information includes one or more of a virtual machine control structure and an extended page table.

Example 7 may include a semiconductor package apparatus, comprising a substrate, and logic coupled to the substrate, wherein the logic is at least partly implemented in one or more of configurable logic and fixed-functionality hardware logic, the logic coupled to the substrate to identify a first encrypted memory alias corresponding to a first portion of memory based on a verification indicator, wherein the first portion is decryptable and readable by both a privileged component and an unprivileged component, and identify a second encrypted memory alias corresponding to a second portion of memory based on the verification indicator, wherein the second portion is accessible by only the unprivileged component.

Example 8 may include the apparatus of Example 7, wherein the logic is further to decrypt and communicate privileged information from the unprivileged component to the privileged component with a first decryption key, verify the privileged information from the unprivileged component, and run the unprivileged component if the privileged information is verified.

Example 9 may include the apparatus of Example 8, wherein the logic is further to determine the first decryption key based on one of the verification indicator used as a tweak to a tweakable cipher and a second decryption key.

Example 10 may include the apparatus of Example 8, wherein the logic is further to read the verification indicator as a most significant bit of a physical memory address.

Example 11 may include the apparatus of any of Examples 8 to 10, wherein the privileged component comprises a virtual machine manager and wherein the unprivileged component comprises a guest virtual machine.

Example 12 may include the apparatus of any of Examples 8 to 10, wherein the privileged information includes one or more of a virtual machine control structure and an extended page table.

Example 13 may include a method of managing a memory, comprising identifying a first encrypted memory alias corresponding to a first portion of memory based on a verification indicator, wherein the first portion is decryptable and readable by both a privileged component and an unprivileged component, and identifying a second encrypted memory alias corresponding to a second portion of memory based on the verification indicator, wherein the second portion is accessible by only the unprivileged component.

Example 14 may include the method of Example 13, further comprising communicating privileged information from the unprivileged component to the privileged component with a first decryption key, verifying the privileged information from the unprivileged component, and running the unprivileged component if the privileged information is verified.

Example 15 may include the method of Example 14, further comprising determining the first decryption key based on one of the verification indicator used as a tweak to a tweakable cipher and a second decryption key.

Example 16 may include the method of Example 14, further comprising reading the verification indicator as a most significant bit of a memory address.

Example 17 may include the method of any of Examples 14 to 16, wherein the privileged component comprises a virtual machine manager and wherein the unprivileged component comprises a guest virtual machine.

Example 18 may include the method of any of Examples 14 to 16, wherein the privileged information includes one or more of a virtual machine control structure and an extended page table.

Example 19 may include at least one computer readable medium, comprising a set of instructions, which when executed by a computing device, cause the computing device to identify a first encrypted memory alias corresponding to a first portion of memory based on a verification indicator, wherein the first portion is decryptable and readable by both a privileged component and an unprivileged component, and identify a second encrypted memory alias corresponding to a second portion of memory based on the verification indicator, wherein the second portion is accessible by only the unprivileged component.

Example 20 may include the at least one computer readable medium of Example 19, comprising a further set of instructions, which when executed by the computing device, cause the computing device to communicate privileged information from the unprivileged component to the privileged component with a first decryption key, verify the privileged information from the unprivileged component, and run the unprivileged component if the privileged information is verified.

Example 21 may include the at least one computer readable medium of Example 20, comprising a further set of instructions, which when executed by the computing device, cause the computing device to determine the first decryption key based on one of the verification indicator used as a tweak to a tweakable cipher and a second decryption key.

Example 22 may include the at least one computer readable medium of Example 20, comprising a further set of instructions, which when executed by the computing device, cause the computing device to read the verification indicator as a most significant bit of a memory address.

Example 23 may include the at least one computer readable medium of any of Examples 20 to 22, wherein the privileged component comprises a virtual machine manager and wherein the unprivileged component comprises a guest virtual machine.

Example 24 may include the at least one computer readable medium of any of Examples 20 to 22, wherein the privileged information includes one or more of a virtual machine control structure and an extended page table.

Example 25 may include a memory manager apparatus, comprising means for identifying a first encrypted memory alias corresponding to a first portion of memory based on a verification indicator, wherein the first portion is decryptable and readable by both a privileged component and an unprivileged component, and means for identifying a second encrypted memory alias corresponding to a second portion of memory based on the verification indicator, wherein the second portion is accessible by only the unprivileged component.

Example 26 may include the apparatus of Example 25, further comprising means for communicating privileged information from the unprivileged component to the privileged component with a first decryption key, means for verifying the privileged information from the unprivileged component, and means for running the unprivileged component if the privileged information is verified.

Example 27 may include the apparatus of Example 26, further comprising means for determining the first decryption key based on one of the verification indicator used as a tweak to a tweakable cipher and a second decryption key.

Example 28 may include the apparatus of Example 26, further comprising means for reading the verification indicator as a most significant bit of a memory address.

Example 29 may include the apparatus of any of Examples 26 to 28, wherein the privileged component comprises a virtual machine manager and wherein the unprivileged component comprises a guest virtual machine.

Example 30 may include the apparatus of any of Examples 26 to 28, wherein the privileged information includes one or more of a virtual machine control structure and an extended page table.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments may be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
a processor;
memory communicatively coupled to the processor; and
logic communicatively coupled to the memory to:
identify a first encrypted memory alias corresponding to a first portion of the memory based on a verification indicator, wherein the first portion is decryptable and readable by both a privileged component and an unprivileged component, and
identify a second encrypted memory alias corresponding to a second portion of the memory based on the verification indicator, wherein the second portion is accessible by only the unprivileged component.

2. The system of claim 1, wherein the logic is further to:
decrypt and communicate privileged information from the unprivileged component to the privileged component with a first decryption key;
verify the privileged information from the unprivileged component; and
run the unprivileged component if the privileged information is verified.

3. The system of claim 2, wherein the logic is further to:
determine the first decryption key based on one of the verification indicator used as a tweak to a tweakable cipher and a second decryption key.

4. The system of claim 2, wherein the logic is further to:
read the verification indicator as a most significant bit of a physical memory address.

5. The system of claim 2, wherein the privileged component comprises a virtual machine manager and wherein the unprivileged component comprises a guest virtual machine.

6. The system of claim 2, wherein the privileged information includes one or more of a virtual machine control structure and an extended page table.

7. A semiconductor package apparatus, comprising:
a substrate; and
logic coupled to the substrate, wherein the logic is at least partly implemented in one or more of configurable logic and fixed-functionality hardware logic, the logic coupled to the substrate to:
identify a first encrypted memory alias corresponding to a first portion of memory based on a verification indicator, wherein the first portion is decryptable and readable by both a privileged component and an unprivileged component, and
identify a second encrypted memory alias corresponding to a second portion of memory based on the verification indicator, wherein the second portion is accessible by only the unprivileged component.

8. The apparatus of claim 7, wherein the logic is further to:
decrypt and communicate privileged information from the unprivileged component to the privileged component with a first decryption key;
verify the privileged information from the unprivileged component; and
run the unprivileged component if the privileged information is verified.

9. The apparatus of claim 8, wherein the logic is further to:
determine the first decryption key based on one of the verification indicator used as a tweak to a tweakable cipher and a second decryption key.

10. The apparatus of claim 8, wherein the logic is further to:
read the verification indicator as a most significant bit of a physical memory address.

11. The apparatus of claim 8, wherein the privileged component comprises a virtual machine manager and wherein the unprivileged component comprises a guest virtual machine.

12. The apparatus of claim 8, wherein the privileged information includes one or more of a virtual machine control structure and an extended page table.

13. A method of managing a memory, comprising:
identifying a first encrypted memory alias corresponding to a first portion of memory based on a verification indicator, wherein the first portion is decryptable and readable by both a privileged component and an unprivileged component; and
identifying a second encrypted memory alias corresponding to a second portion of memory based on the verification indicator, wherein the second portion is accessible by only the unprivileged component.

14. The method of claim 13, further comprising:
communicating privileged information from the unprivileged component to the privileged component with a first decryption key;
verifying the privileged information from the unprivileged component; and
running the unprivileged component if the privileged information is verified.

15. The method of claim 14, further comprising:
determining the first decryption key based on one of the verification indicator used as a tweak to a tweakable cipher and a second decryption key.

16. The method of claim 14, further comprising:
reading the verification indicator as a most significant bit of a memory address.

17. The method of claim 14, wherein the privileged component comprises a virtual machine manager and wherein the unprivileged component comprises a guest virtual machine.

18. The method of claim 14, wherein the privileged information includes one or more of a virtual machine control structure and an extended page table.

19. At least one non-transitory computer readable medium, comprising a set of instructions stored in memory, which when executed by a computing device, cause the computing device to:
identify a first encrypted memory alias corresponding to a first portion of memory based on a verification indicator, wherein the first portion is decryptable and readable by both a privileged component and an unprivileged component; and
identify a second encrypted memory alias corresponding to a second portion of memory based on the verification indicator, wherein the second portion is accessible by only the unprivileged component.

20. The at least one non-transitory computer readable medium of claim 19, comprising a further set of instructions stored in memory, which when executed by the computing device, cause the computing device to:
communicate privileged information from the unprivileged component to the privileged component with a first decryption key;
verify the privileged information from the unprivileged component; and
run the unprivileged component if the privileged information is verified.

21. The at least one non-transitory computer readable medium of claim 20, comprising a further set of instructions stored in memory, which when executed by the computing device, cause the computing device to:
determine the first decryption key based on one of the verification indicator used as a tweak to a tweakable cipher and a second decryption key.

22. The at least one non-transitory computer readable medium of claim 20, comprising a further set of instructions stored in memory, which when executed by the computing device, cause the computing device to:
read the verification indicator as a most significant bit of a memory address.

23. The at least one non-transitory computer readable medium of claim 20, wherein the privileged component comprises a virtual machine manager and wherein the unprivileged component comprises a guest virtual machine.

24. The at least one non-transitory computer readable medium of claim 20, wherein the privileged information includes one or more of a virtual machine control structure and an extended page table.

* * * * *